United States Patent [19]

Inaba et al.

[11] Patent Number: 5,155,671

[45] Date of Patent: Oct. 13, 1992

[54] POWER CONVERTER WITH CURRENT-TYPE INVERTER

[75] Inventors: Hiromi Inaba; Kiyoshi Nakamura; Sadao Hokari, all of Katsuta; Yoshio Sakai, Ibaraki; Naoyuki Outi, Hitachi; Takeki Ando, Ibaraki; Satoshi Fukuda, Mito, all of Japan

[73] Assignees: Hitachi Ltd.; Hitachi Elevator Engineering and Service Co., Ltd., both of Tokyo; Hitachi Engineering Co., Ltd., Ibaraki, all of Japan

[21] Appl. No.: 490,466

[22] Filed: Mar. 8, 1990

[30] Foreign Application Priority Data

Mar. 13, 1989 [JP] Japan ............................ 1-57943

[51] Int. Cl.⁵ .................................................. H02M 5/45
[52] U.S. Cl. ................................................. 363/37; 363/41
[58] Field of Search ................... 363/35, 37, 39, 40, 363/41, 42, 51; 318/811

[56] References Cited

U.S. PATENT DOCUMENTS

| | | | |
|---|---|---|---|
| 4,488,103 | 12/1984 | Norinaga et al. | 318/811 |
| 4,666,020 | 5/1987 | Watanabe et al. | 363/37 X |
| 4,672,520 | 6/1987 | Ueda et al. | 363/37 |
| 4,788,485 | 11/1988 | Kawagishi et al. | 363/37 X |
| 4,829,416 | 5/1989 | Inaba et al. | 363/41 |
| 4,833,586 | 5/1989 | Inaba et al. | 363/41 |
| 4,870,556 | 9/1989 | Inaba et al. | 363/41 |
| 4,924,373 | 5/1990 | Inaba et al. | 363/41 X |

FOREIGN PATENT DOCUMENTS

| | | |
|---|---|---|
| 163577 | 7/1987 | Japan . |
| 171470 | 7/1987 | Japan . |
| 290359 | 12/1987 | Japan . |
| 7165 | 1/1988 | Japan . |
| 7166 | 1/1988 | Japan . |
| 2180108 | 3/1987 | United Kingdom . |
| 2186127 | 8/1987 | United Kingdom . |

OTHER PUBLICATIONS

Inaba et al., "One-chip Microprocessor-based PWM Control Method on Current Source Inverter System", IEEE National Conference, 1987.

*Primary Examiner*—William H. Beha, Jr.
*Assistant Examiner*—Kristine L. Peckman
*Attorney, Agent, or Firm*—Antonelli, Terry, Stout & Kraus

[57] ABSTRACT

A power converter comprising a current-type inverter is disclosed, in which an output of a converter unit is applied as an input to the inverter unit through a DC reactor, and AC power is supplied to a load from the inverter unit. A ripple component of the DC input of the inverter unit is detected, and the switching elements of the inverter unit are controlled by modulation rate if they are to be subjected to PWM control, thus completing a sinusoidal waveform of the output of the inverter unit. Specifically, since the input to the inverter unit is allowed to contain a ripple, the DC reactor is reduced in size. The output of the inverter unit is a sinusoidal AC power containing no high harmonics and therefore the load is free of effects of high harmonics.

21 Claims, 17 Drawing Sheets

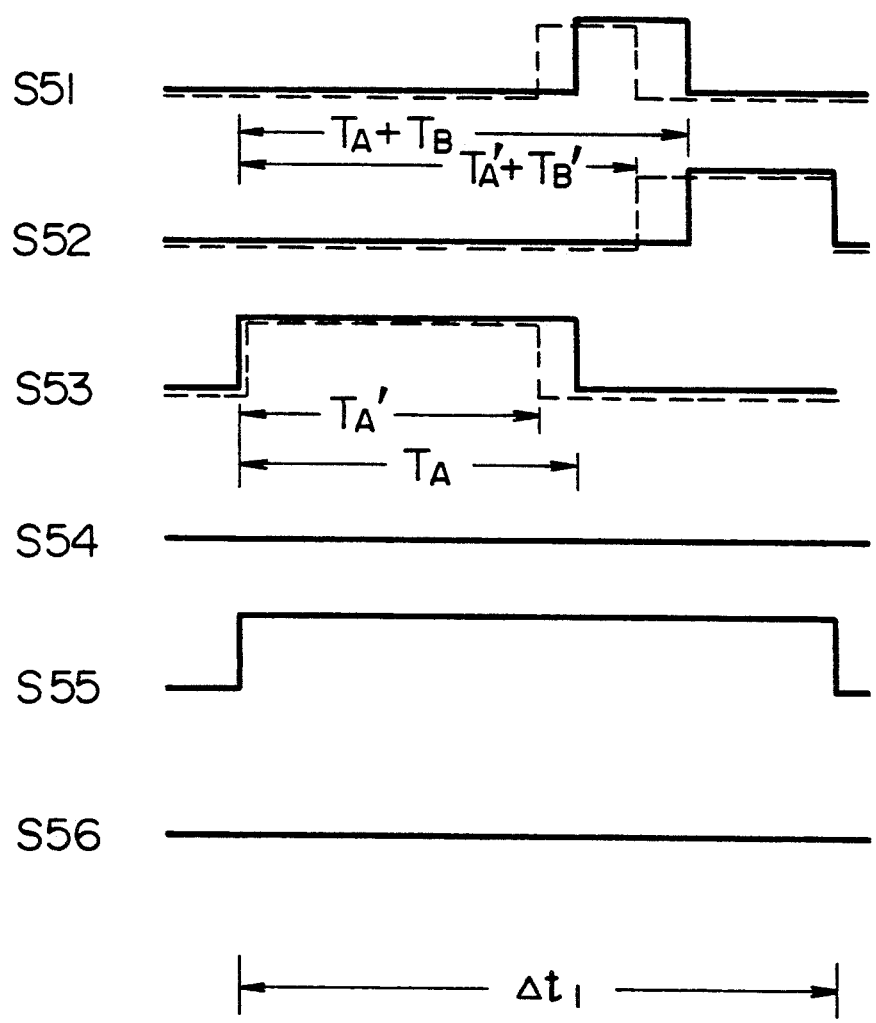
F I G. 3

FIG. 8A
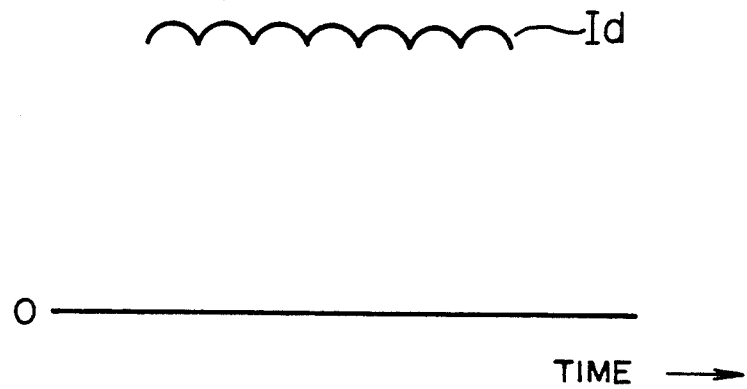
FIG. 8B
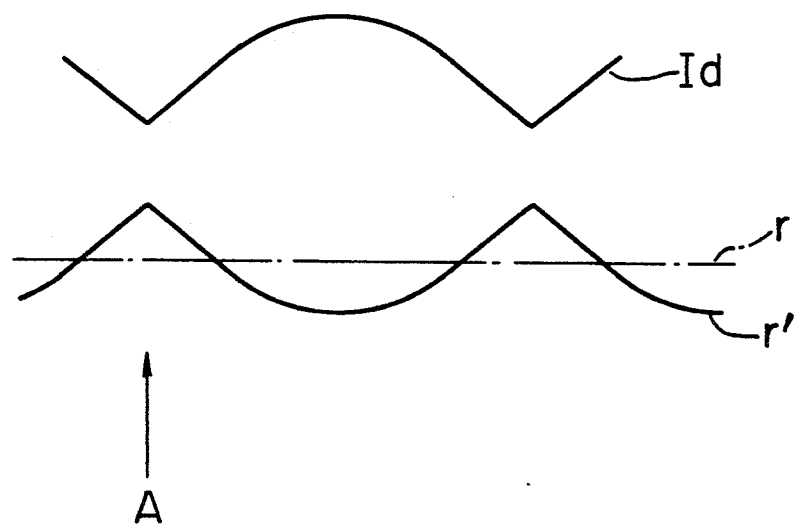
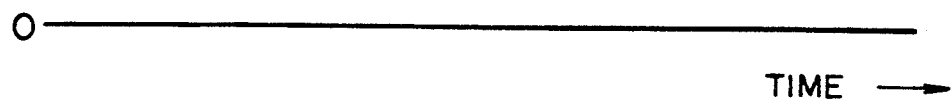

:

POWER CONVERTER WITH CURRENT-TYPE INVERTER

BACKGROUND OF THE INVENTION

1. Field of the Invention

The present invention relates to a power converter, or more in particular to a power converter comprising a current-type inverter adapted to prevent the high harmonic components of the output of the current-type inverter from having an effect on the load while adding various new functions to a power conversion system.

2. Description of Related Art

There has recently been suggested a PWM current-type inverter having an advantage in that the control circuit thereof is simple in configuration and that the noises of the motor driven by use of it are reduced, as disclosed in JP-A-62-163579. Also, an application of this PWM current-type inverter to the elevator control requiring high reliability and quietude is reported in Article No. 15 at 1987 National Conference of the Institute of Electrical Engineers of Japan.

The power converter of this type comprises a converter unit and an inverter unit with a DC reactor interposed therebetween. The converter unit is subjected to PWM current control by a control unit including a one-chip microcomputer, and the inverter unit is subjected to frequency control also by PWM control of a control unit including a microcomputer. The microcomputer of the converter unit receives a zero-cross signal from a power supply for effecting synchronization using the same. Methods of synchronization with a power supply are suggested in JP-A-62-171470, JP-A-62-290359, JP-A-63-7165 and JP-A-63-7166.

The disadvantages of the conventional methods, however, are that in the case where the power synchronization fails to be effected with high accuracy, the DC output current of the converter unit develops a ripple about 6 or 12 times as large as the power frequency, and that if the inductance of the DC reactor is small, the particular ripple is applied to an induction motor constituting a load through the inverter unit, thereby undesirably causing a torque ripple in the motor. A torque ripple, which is a rotational pulsation, causes a vibration or noise in a mechanical system and may damage a joint or the like parts. Also, an elevator which is driven by an induction motor may become uncomfortable to ride in. This problem is apparently avoided in the conventional methods by setting the inductance of the D reactor at a sufficiently high level. In spite of this, when the whole system is large in capacity, the volume and cost of the DC reactor are increased unavoidably. In a large-capacity system, therefore, it is necessary to reduce both the volume and cost of the DC reactor thereof.

A technique for improving this point has been suggested in Article No. 1483 at the 1987 National Conference of the Institute of Electrical Engineers of Japan. This suggestion was to switch the inverter pulse distribution in accordance with the DC power ripple in controlling a current-type inverter system. The output current of the inverter, however, is not necessarily in sinusoidal form but contains many high harmonic components therein. The torque ripple is thus not reduced sufficiently.

JP-A-62-163577, on the other hand, proposes a system for matching the sinusoidal characteristic of the output of a current-type inverter system with the effective utilization of the output current, wherein a predetermined time interval divided proportionately to the instant values of the sinusoidal waves of three phases, respectively, at each sampling. This prior art method has yet to solve the problems of which high harmonics contained in the output current are to be removed selectively and, for this purpose, how the width of the PWM pulse is to be calculated.

As described above, the conventional methods fail to pay sufficient attention to reducing the inductance of a DC reactor or high harmonic components of the output of a current-type inverter system in full consideration of the control of the inverter unit thereof. It is, therefore, difficult to reduce the size of the DC reactor at a reduced cost or reduce the high harmonic output components.

SUMMARY OF THE INVENTION

Accordingly, it is an object of the present invention to provide a power converter comprising a current-type inverter permitting the reduction in the size of a DC reactor.

Another object of the invention is to provide a power converter comprising a current-type inverter adapted for supplying a load with a current containing a reduced high harmonic component thereof.

Still, another object of the present invention is to provide a power converter comprising a current-type inverter adapted for supplying a load with a current having a specific high harmonic component reduced of all the high harmonic components thereof.

According to the present invention, there is provided a power converter comprising a PWM control system for an inverter unit, including means for controlling the modulation rate of PWM control based on various instructions.

The introduction of the control of the modulation rate in PWM control of the PWM control system of an inverter unit permits the output current of the inverter unit to be controlled accurately in accordance with a predetermined instruction, so that the effect of the ripple superimposed on the direct current supplied to the inverter and that of the high harmonic components of the output current are transmitted less to an induction motor making up a load, thus making the induction motor or load controllable faithfully to an instruction.

BRIEF DESCRIPTION OF THE DRAWINGS

FIG. 3 is a timing chart showing an example of pulse pattern given to each transistor of the inverter unit in the embodiment shown in FIG. 1.

FIGS. 8A and 8B are diagrams showing the relationship between the ripple component of the DC current and the correction of the modulation rate data effected according to the embodiment shown in FIG. 6.

DESCRIPTION OF THE PREFERRED EMBODIMENTS

Figure 1:
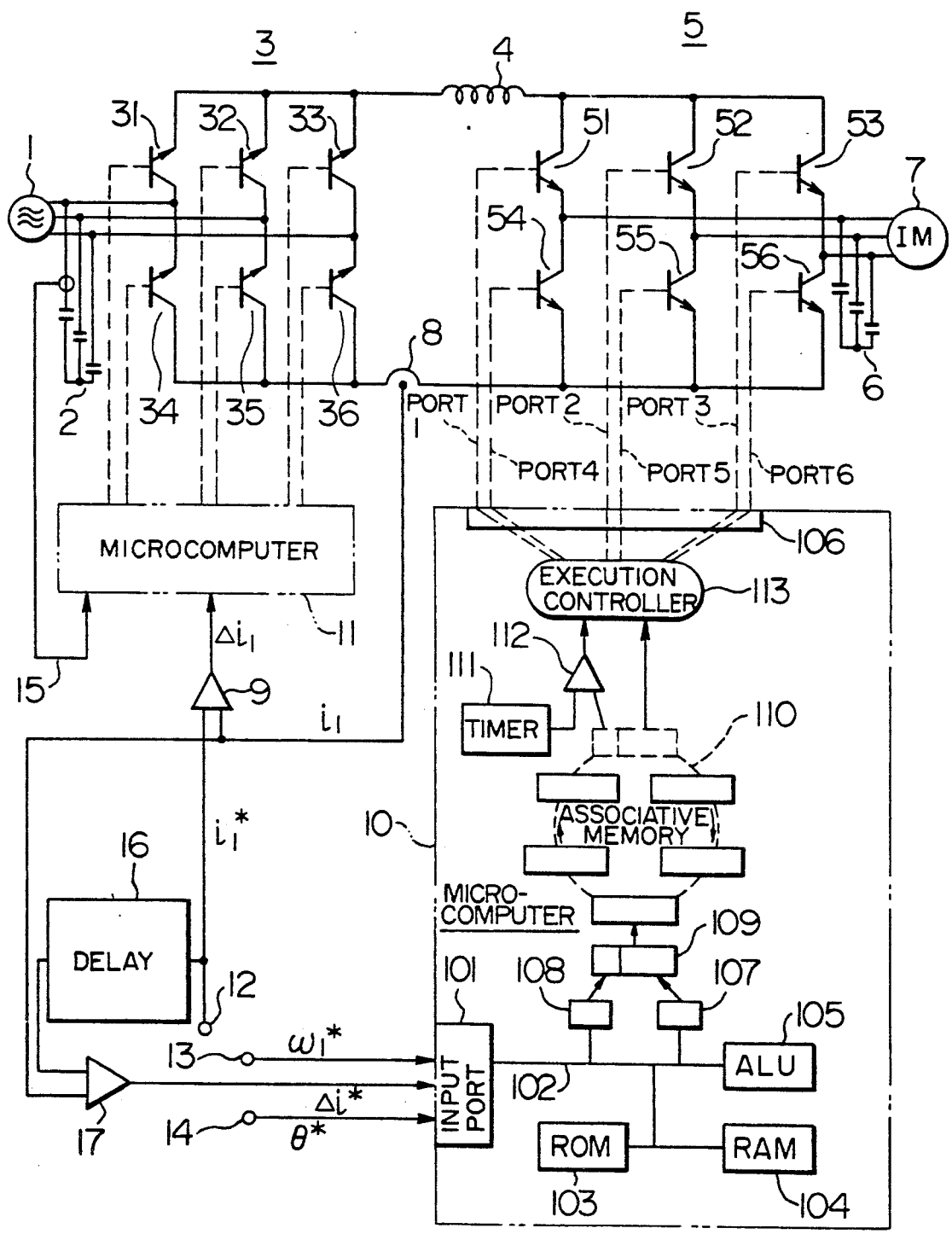
FIG. 1 is a block diagram showing a basic circuit configuration of a current-type inverter according to an embodiment of the present invention.

In a first embodiment of the present invention shown in FIG. 1, reference numeral 1 designates a three-phase AC power supply, numeral 2 an overvoltage-controlling capacitor, numeral 3 a current-type converter unit, numerals 31 to 36 transistors making up main switching elements thereof, numeral 4 a DC reactor, numeral 5 being a current-type inverter unit, numerals 51 to 56 transistors making up main switching elements thereof, numeral 6 being an overvoltage-controlling capacitor, numeral 7 being an induction motor illustrated as an example of load, numeral 8 being a DC current detector, numeral 9 being a comparator for comparing the primary current instruction $i_1$ with a feedback value $i_1$, and numerals 10, 11 being one-chip microcomputers forming the nucleus of a control section for supplying a pulse pattern (control signal) to the transistors 31 to 36 and 51 to 56 (These one-chip microcomputers 10 and 11 are constructed of the same hardware and therefore the one-chip microcomputer 10 will be mainly referred to in the following explanation). Incidentally, the microcomputer 11 of the converter unit 3 performs the processings for (1) power synchronization, (2) issuing a frequency instruction coincident with the power frequency, and (3) preparing a phase instruction from a current error. Also, the current is controlled by PWM control.

The one-chip microcomputer 10 which is for controlling the frequency of the inverter unit 5 by PWM control, includes an input port 101, an internal bus 102, a ROM 103 for storing a program, a pulse width data table, etc., a RAM 104 used for temporary storage or as a register, an ALU 105 for executing computations and the like, an event setting register 107 (The "event" means indicating whether an output signal is high or low in level) for applying a control signal including a predetermined pulse pattern to the output port 106, a time setting register 108 for setting the time when the particular event is enabled, a holding register 109 for connecting and holding the contents of the setting registers 107, 108, an associative memory 110 in which several sets of data set in the holding register 109 are stored in cycles sequentially, a timer 111 for producing an actual time data, a comparator 112 for comparing the time on the timer 111 with the set time data in the associative memory 110 and producing an output therefrom when they coincide with each other, and an execution controller 113 for applying to the output port 106 and controlling the event set triggered by the comparator 112.

Numeral 12 designates a terminal supplied with a primary current instruction $i_1^*$ applied to the inverter control system, numerals 13, 14 designates terminals supplied with a frequency instruction $\omega_1^*$ and a phase instruction $\theta^*$ applied to the inverter control system, and numeral 15 being a signal line for supplying a signal for power synchronization. The primary current instruction signal $i_1^*$ is adapted to be applied to the comparator 17 through a delay element 16 for causing a delay corresponding to the response delay in a current control system, that is, such that a feedback control loop that the primary current instruction signal $i_1^*$ and a DC current detected by the detector 8 are compared and an error therebetween $\Delta i_1$ is detected by the comparator 9 and is reduced to zero. The DC current $i_1$ detected by the DC current detector 8, on the other hand, is also applied to the comparator 17, and the current ripple component $\Delta i^*$ produced from the comparator 17 is applied to the one-chip microcomputer 10 for controlling the inverter unit 5.

Figure 2:
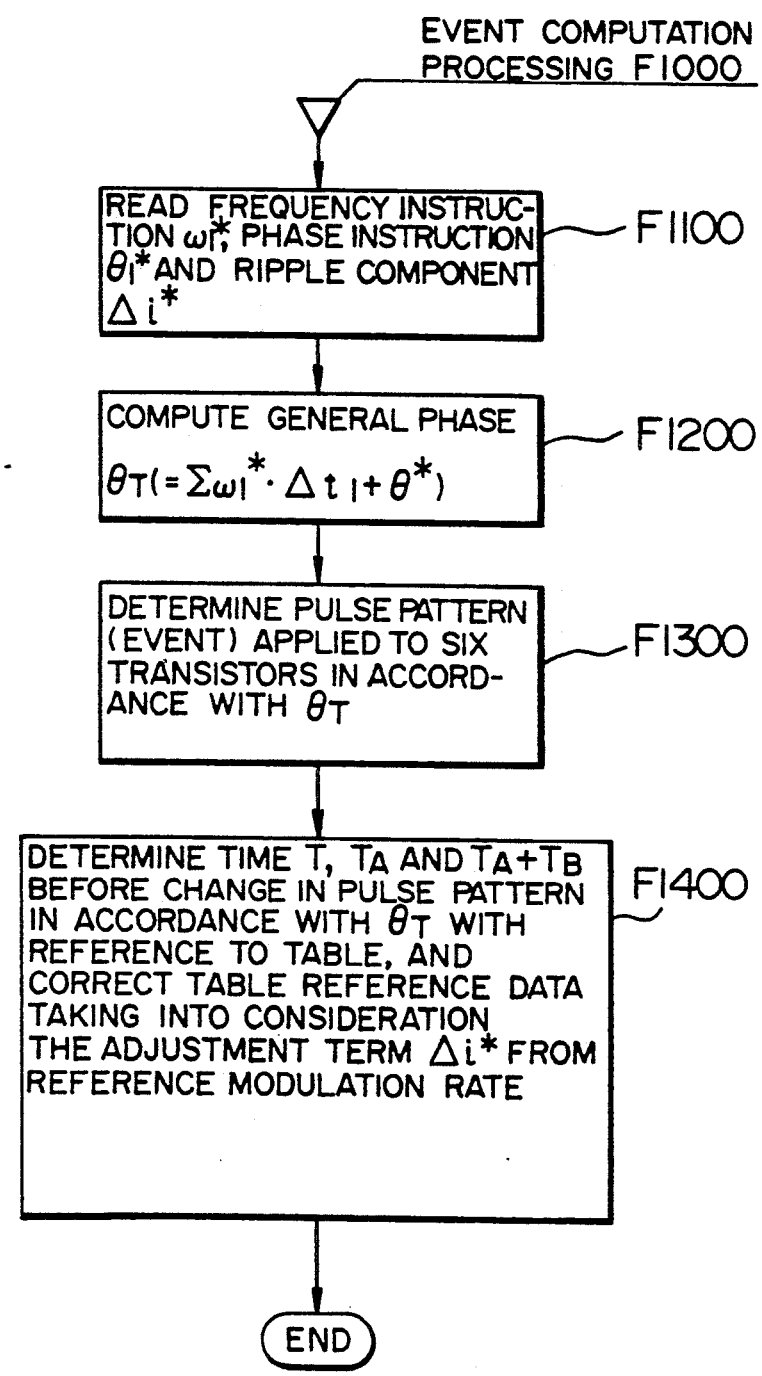
FIG. 2 is a flowchart of the event computation processing according to an embodiment of the present invention.

Now, with regard to an event caused at the output port 106 according to a first embodiment of the present invention, the processing flow of an event computation processing program F1000 for determining a pulse pattern applied to the transistors 51 to 56 (S51 to S56) making up main switching devices of the inverter unit 5 in the one-chip microcomputer will be explained with reference to FIG. 2.

(1) First, step F1100 reads from the input port 101 the ripple component $\Delta i^*$ providing an adjustment term in controlling the frequency instruction $\omega_1^*$, the phase instruction $\theta^*$ and the modulation rate. In the case where the frequency instruction $\omega_1^*$ and the phase instruction $\theta^*$ are computed in the one-chip microcomputer 10, the input port may be read only for the ripple component but not for any others.

(2) Step F1200 integrates the frequency instruction $\omega_1^*$(Hz) at every predetermined time interval $\Delta t_1$, and the phase instruction $\theta^*$ is added to the result of integration to determine general phase $\theta_T$.

(3) Step F1300 determines one of the six modes of pulse pattern into which the electrical angle of 360° is divided for each 60°, to be produced for the present general phase $\theta_T$ that is, an output event defined in accordance with the general phase $\theta_T$. The relationship between the general phase $\theta_T$ and the six modes, which is not directly connected with the substance of the present invention and will not be described in detail, is explained in JP-A-62-163577, for example.

(4) Finally, step F1400 determines the times $T_A$ and $T_A + T_B$ at which the binary level, 0 or 1, of the pulse is changed, respectively, during the interrupt interval $\Delta t_1$ (As shown in FIG. 3, $T_A$ is a turn-on period of S53, $T_B$ a turn-on period of S51, and $\Delta t_1 - (T_A + T_B)$ a turn-on period of S52 when $0 \leq \theta_T \leq 60°$) with reference to a data table based on the general phase $\theta_T$.

Further, on the basis of a modulation rate $(\gamma - \Delta_i^*)$ determined from the current ripple $\Delta_i^*$ taken in and a reference modulation rate $\gamma$ for determining the degree to which the output of the converter unit 3 is changed by the inverter unit 5 in the microcomputer, the time data $T_A$ and $T_A + T_B$ searched for above are corrected in the manner mentioned below.

$$T_A' \leftarrow (\gamma - \Delta_i^*) \cdot T_A \quad (1)$$

$$(T_A' + T_B') \leftarrow (\gamma - \Delta_i^*) \cdot (T_A + T_B) \quad (2)$$

This correction is effected by rewriting the time data $T_A$ and $T_A + T_B$ Searched for into $\gamma \cdot T_A$ and $\gamma \cdot (T_A + T_B)$ respectively in accordance with the reference modulation rate data $\gamma$, if the ripple component $\Delta_i^*$ is zero, for example. In the case where the ripple component $\Delta_i^*$ is positive, that is, in the case where the DC current $i_1$ detected by the DC current detector 8 is slightly larger than the current instruction $i_1^*$, the modulation rate instruction taking the ripple component $\Delta_i^*$, that is, the adjustment term into consideration is $(\gamma - \Delta_i^*)$, which is a value smaller than the reference value $\gamma$ by $\Delta_i^*$. Thus, when the ripple component $\Delta_i^*$ is negative, the modulation rate instruction is $(\gamma - (-\Delta_i^*))$ which is larger than the reference value $\gamma$ by $\Delta_i^*$. If the time data $T_A$ and $T_A + T_B$ searched for are modified by use of this value, the time data $T_A'$ and $T_A' + T_B'$ after correction have a time width thereof shorter than the time data $T_A$ and $T_A + T_B$ by a value equivalent to the ripple component $\Delta_i^*$. The above-mentioned reference modulation rate $\gamma$ which may be corrected in either the positive or negative direction according to the ripple component is set to a value smaller than unity such as 0.9 or 0.95. This is also the case with the other embodiments described below.

FIG. 3 shows an example of the pulse patterns S51 to S56 applied to the switching elements 51 to 56, respectively, for one switching period $\Delta t_1$ of the transistors, that is, a part of the on and off pulse patterns applied to the transistors 51 to 56 of the inverter unit 5. In FIG. 3, the solid lines indicate the lack of ripple, and the dashed lines the presence of ripple.

The pulse width data is corrected by a value corresponding to $\Delta_i^*$ in the pulse width for the transistor S52 providing a shorting phase thereby to increase or decrease the shortcircuiting current. In other words, in the case where $\Delta_i^*$ is positive, the ripple component thereof fails to be produced as an output of the inverter unit 5 but flows through the transistor S52 that is a shortcircuiting phase arm. When $\Delta_i^*$ is negative, by contrast, $T_A + T_B < T_A' + T_B'$, and therefore, the pulse width applied to the transistor S52 is shortened, so that the current flowing in the transistor S52 by shortcircuiting is reduced by the amount of the ripple, thereby increasing the the output of the inverter unit 5. As a result, even if the input DC current to the inverter unit 5 is larger or smaller by the ripple component $\Delta_i^*$ than the current instruction $i_1^*$, the output current of the inverter unit 5 is controlled to coincide with the current instruction $i_1^*$, and the output current is produced in sinusoidal form.

The reason why step F1400 determines the reference modulation rate $\gamma$ and controls the modulation rate of the inverter unit 5 around the reference modulation rate $\gamma$ is because the ripple component $\Delta_i^*$ detected has both positive and negative characteristics and therefore the modulation rate may be required to be corrected upward unlike in the aforementioned case. Assuming that the reference modulation rate $\gamma$ is 0.95, for instance, the current utilization rate at the inverter unit 5 falls by an average of 5%.

The delay element 16 for determining the ripple component $\Delta_i^*$ is inserted against the current instruction $i_1^*$ by reason of the fact that simple comparison between the current instruction $i_1^*$ and the detected current $i_1$ would cause a detected ripple component to mix with a transient error under an abrupt change in the current instruction $i_1^*$ with the result that the control system of the converter unit 3 would undesirably interfere with that of the inverter unit 5. The delay element according to the embodiment of the present invention is based on a simulation of the operation delay of the current control system. If means for limiting the adjustment term $(\gamma - \Delta_i^*)$ for the modulation rate against the current ripple component $\Delta_i^*$ is attached to the comparator 17, or is incorporated in step F1400 in FIG. 2 for software processing of the microcomputer 10, however, the phenomenon of interference mentioned above is prevented. In that case, the delay element 16 may be done.

Figure 4:
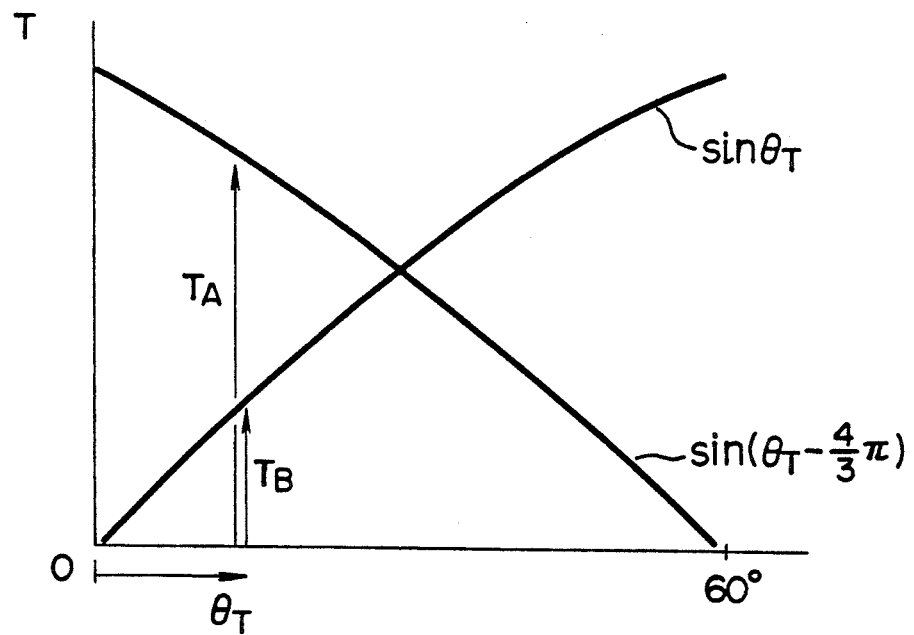
FIG. 4 is a diagram for explaining the operation of step F1400 in the flowchart of FIG. 2.

In processing the aforementioned step F1400, in order to determine the pulse widths $T_A$ and $T_B$ in accordance with the general phase $\theta_T$, a table is searched for. Specifically, this search is made by checking a look-up table showing the values of a pair of sinusoidal curves at each of predetermined electrical angles or phases $\theta_T$ in a range of electrical angles of 0° to 60°, as shown in FIG. 4. The pulse width for the shortcircuiting phase is determined as $(\Delta t_1 - T_A - T_B)$ as described above, and therefore no specific table is required. A method of calculating the pulse width by distribution of crest values of sinusoidal wave is described in detail in JP-A-62-163577 referred to above.

The process mentioned above determines two data items including the contents of an event and the time of event change set in the event setting register 107 and the time setting register 108. These items are required to be set in the associative memory 110 for output port control in order to control the transistors 51 to 56 of the inverter unit 5 through the output port 106.

Figure 5:
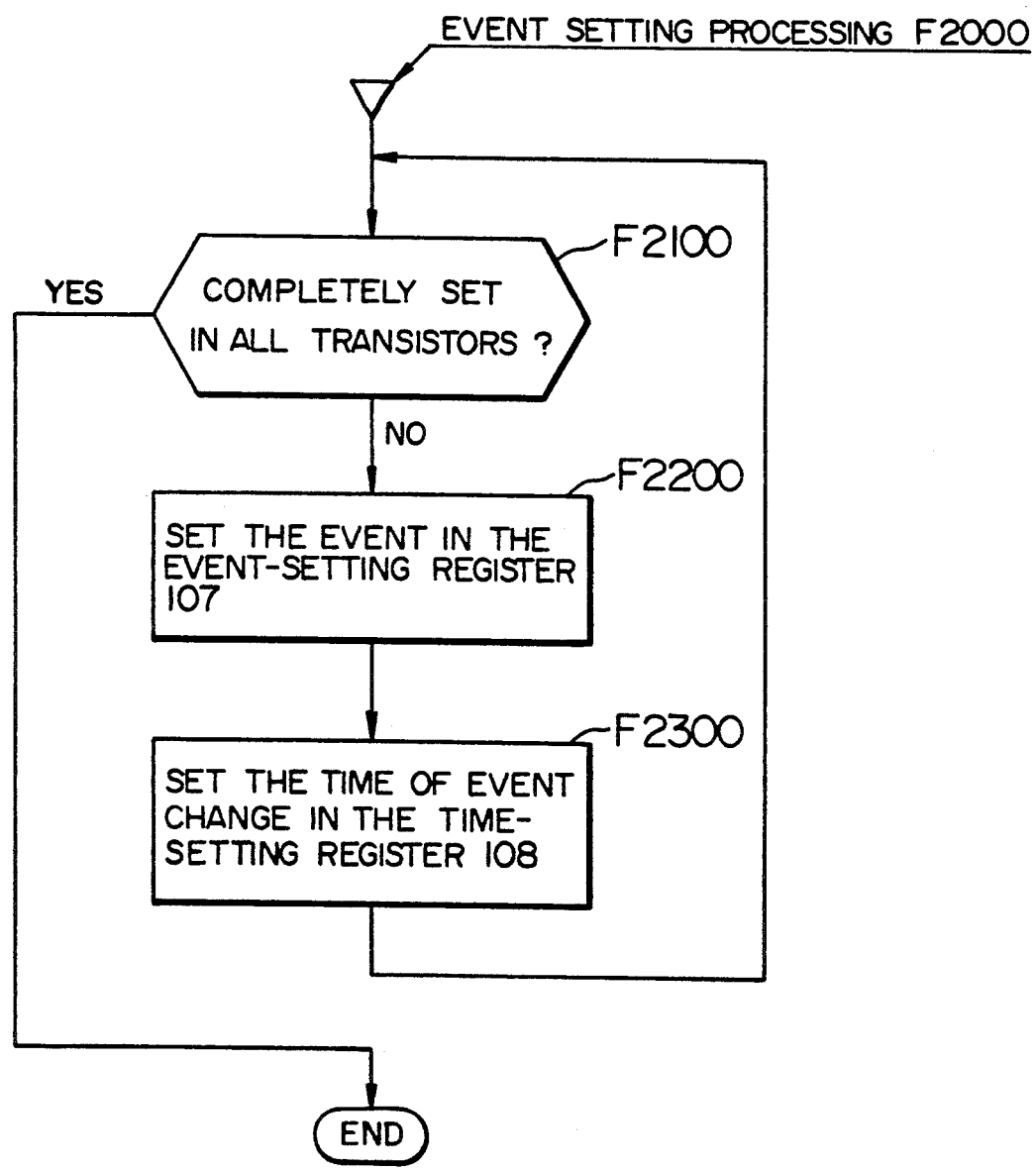
FIG. 5 is a flowchart of the event setting processing for a pulse pattern effected in a microcomputer 10 according to an embodiment of the present invention.

A flow of the process F2000 for setting these items is shown in FIG. 5, with reference to which explanation will be made below. This process F2000 is effected in the microcomputer 10.

(1) First, step F2100 determines whether an event and the time are set completely as required in the six transistors of the inverter unit 5. If the answer is "Yes", the process is finished.

(2) If the decision at step F2100 is "No", on the other hand, step F2200 sets a corresponding event in the event setting register 107, followed by step F2300 for setting the time of event change in the time setting register 108 thereby to complete the process.

The above-mentioned event setting process F2000 and the time computation process F1000 may be energized for each switching interval time $\Delta t_1$ of the transistors 51 to 56 making up main switching elements of the inverter unit 5 respectively, that is to say, for each time providing a reciprocal of the switching frequency. In other words, as far as the event computation and event setting are effected for each time of $\Delta t_1$, the latest pulse pattern is always produced from the output port 106 of the microcomputer 10 for controlling the inverter unit 5.

According to the first embodiment of the present invention mentioned above, the modulation rate is controlled for the inverter unit in such a way as to offset the ripple component of the DC current applied to the inverter unit, and therefore the DC reactor is reduced greatly, even in the presence of a ripple component, that is, even if the inductance of the DC reactor inserted between the converter unit and the inverter unit is small.

The absence of a ripple component in the output current of the inverter unit 5 assures smooth revolutions of the motor 7, reduces the noises or vibrations of the mechanical system, and greatly improves the riding quality of an elevator which may be driven by the motor 7.

The allowability to contain a ripple component in the output current of the converter unit 3 eliminates the process of minimizing the ripple component on the part of the microcomputer 11 of the converter unit 3, and accordingly a sophisticated device is not required as the microcomputer 11.

Figure 6:
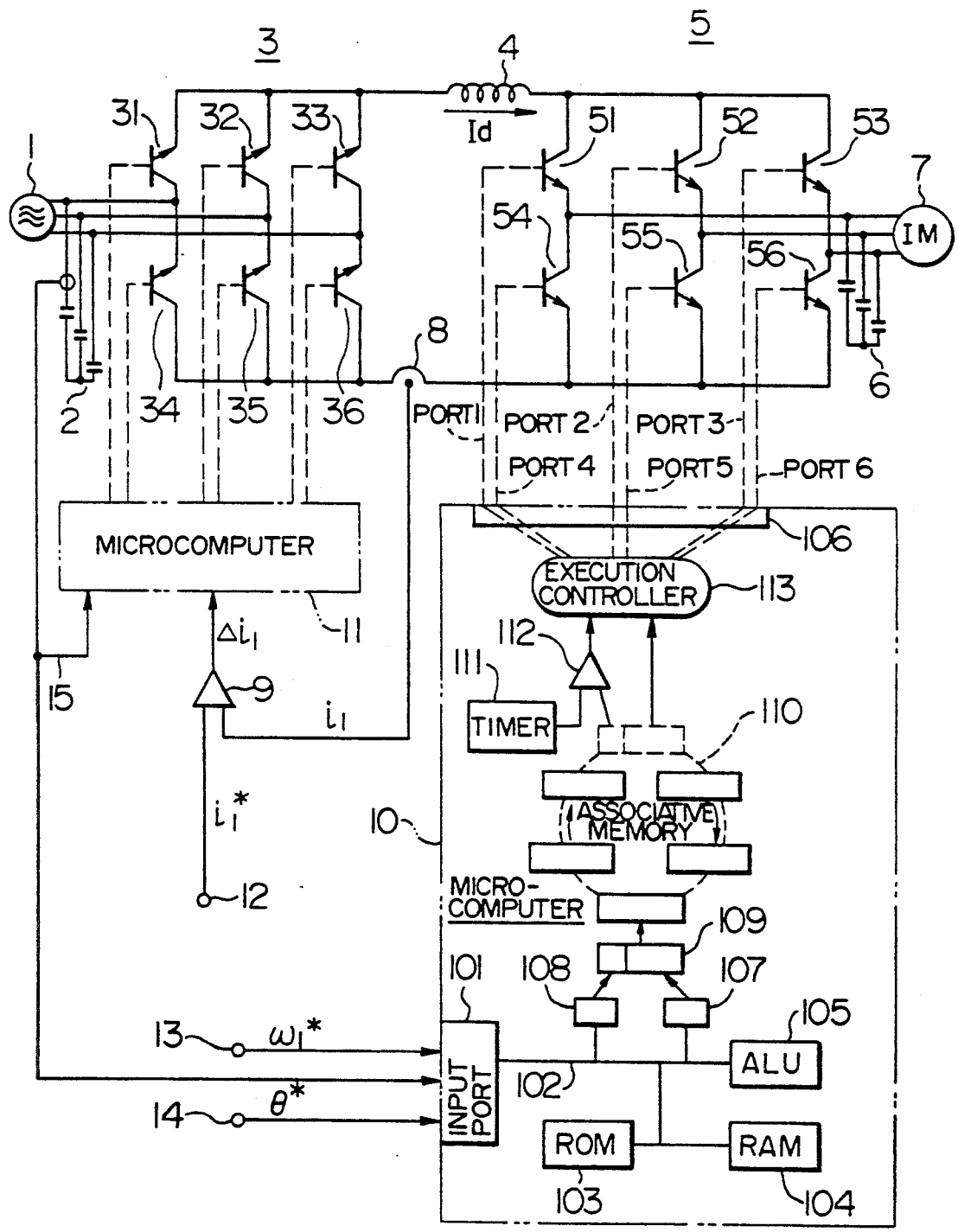
FIG. 6 is a block diagram showing a basic circuit configuration of a current-type, inverter according to a second embodiment of the present invention.

FIG. 6 shows a second embodiment of the present invention, in which a rectification ripple of the converter unit 3 supplied with a three-phase AC power from a power supply 1 is estimated and this ripple component is cancelled by controlling the modulation rate on the side of the inverter unit 5. This embodiment is different from the first embodiment shown in FIG. 1 in that in the embodiment under consideration, a power sync signal 15 for detecting the starting point of a ripple is applied to a micro-computer for controlling the inverter unit 5. The parts in FIG. 6 are configured in the same way as in the first embodiment. In FIG. 6, the component parts designated by the same reference numerals as in FIG. 1 designate corresponding or identical parts respectively.

Figure 7:
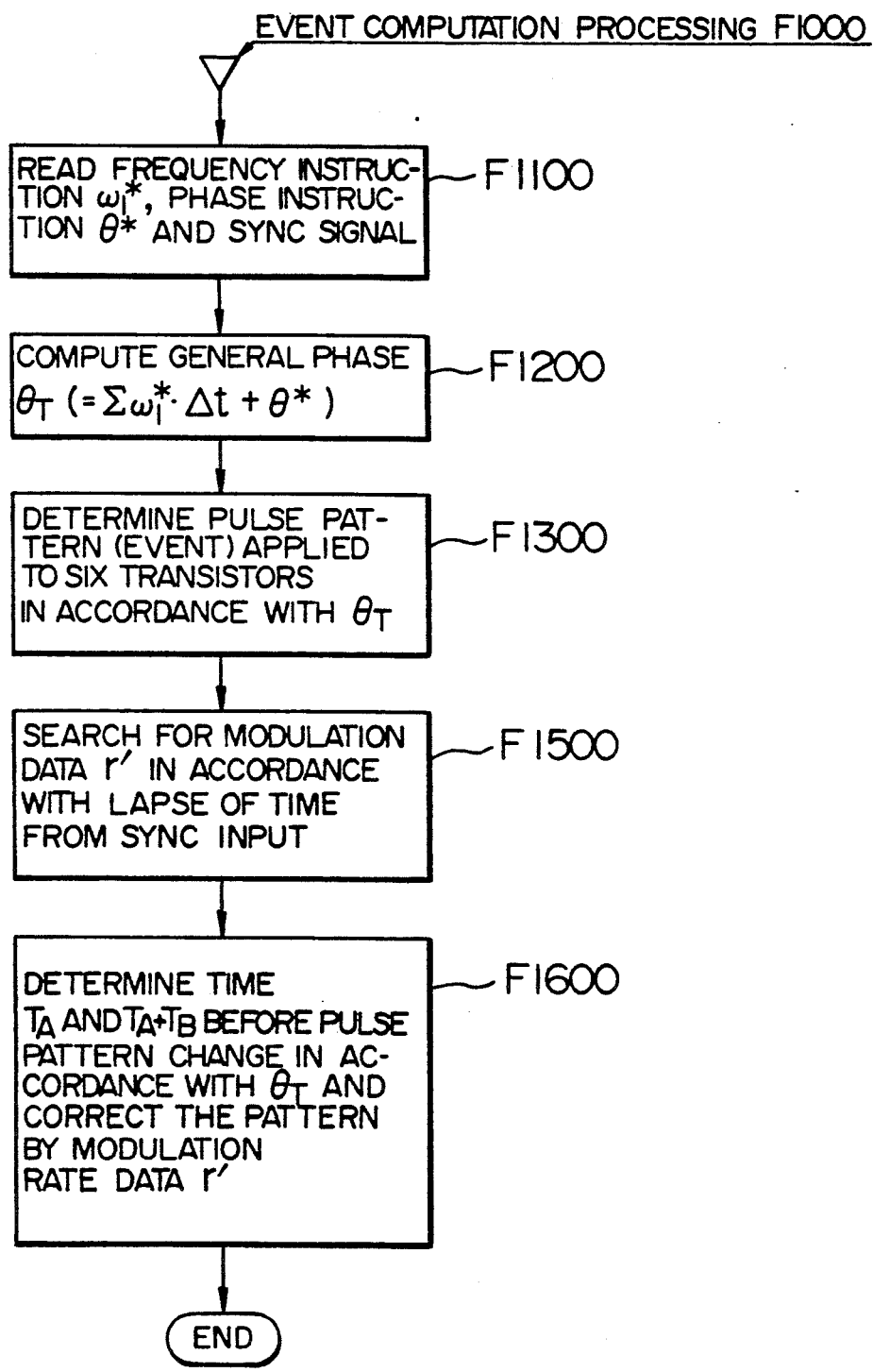
FIG. 7 is a flowchart of the event computation processing in the embodiment shown in FIG. 6.

The operation of this second embodiment of the present invention will be explained with reference to step F1000 representing the event computation process shown in FIG. 7 and the current waveform shown in FIG. 8. The event computation processing F1000 is effected in the microcomputer 10.

(1) As in the processing according to the first embodiment explained with reference to FIG. 2, steps F1100 to F1300 read the frequency instruction $\omega_1^*$, phase instruction $\theta^*$ and the power sync signal 15, calculate the general phase $\theta_T$ and thus determine the pulse pattern (event) to be given to the six transistors.

(2) Then, step F1500 searches the modulation rate data $\gamma'$ in accordance with the lapse of time from the input of the power sync signal 15.

Generally, the DC output $I_d$ of the converter unit 3 has a waveform shown in FIG. 8A due to the ripple component superimposed thereon. The above-mentioned modulation rate data $\gamma'$ for correction is such as to offset the ripple of the DC current $I_d$ as an example thereof is shown in FIG. 8B, or in average, such a data as to alternate vertically above and below the reference modulation rate data $\gamma'$. If a data as shown in FIG. 8B is offered as a table to which reference is made by the time lapse from the input time (A) of the sync signal from the signal porch 15, it is possible to obtain a modulation rate data $\gamma'$ for correction.

(3) Step F1600 then determines from FIG. 4 the time data $T_A$ and $T_A+T_B$ taken before the pulse pattern is changed in accordance with the general phase $\theta_T$ computed at step F1200. Further, the modulation rate $\gamma'$ for correction determined at step F1500 is multiplied by these time data thereby to calculate the corrected time data $T_A'$ and $T_A'+T_B'$ ($T_A'=T_A\cdot\gamma'$, $T_A'+T_B'=T_A'\cdot\gamma'+T_B\cdot\gamma'$). These values are used as a pulse pattern-setting data.

According to the second embodiment described above, it is possible to offset the ripple of a DC current by control at the inverter unit simply by taking in the power sync signal, and therefore as in the first embodiment, the DC reactor is reduced in size and a special comparator circuit and the like are eliminated outside of the control unit, thus simplifying the circuit configuration.

Also in this embodiment, as in the first embodiment, the ripple current component $\Delta i^*$ may be taken into consideration by applying the same component to the microcomputer 10.

Figure 9:
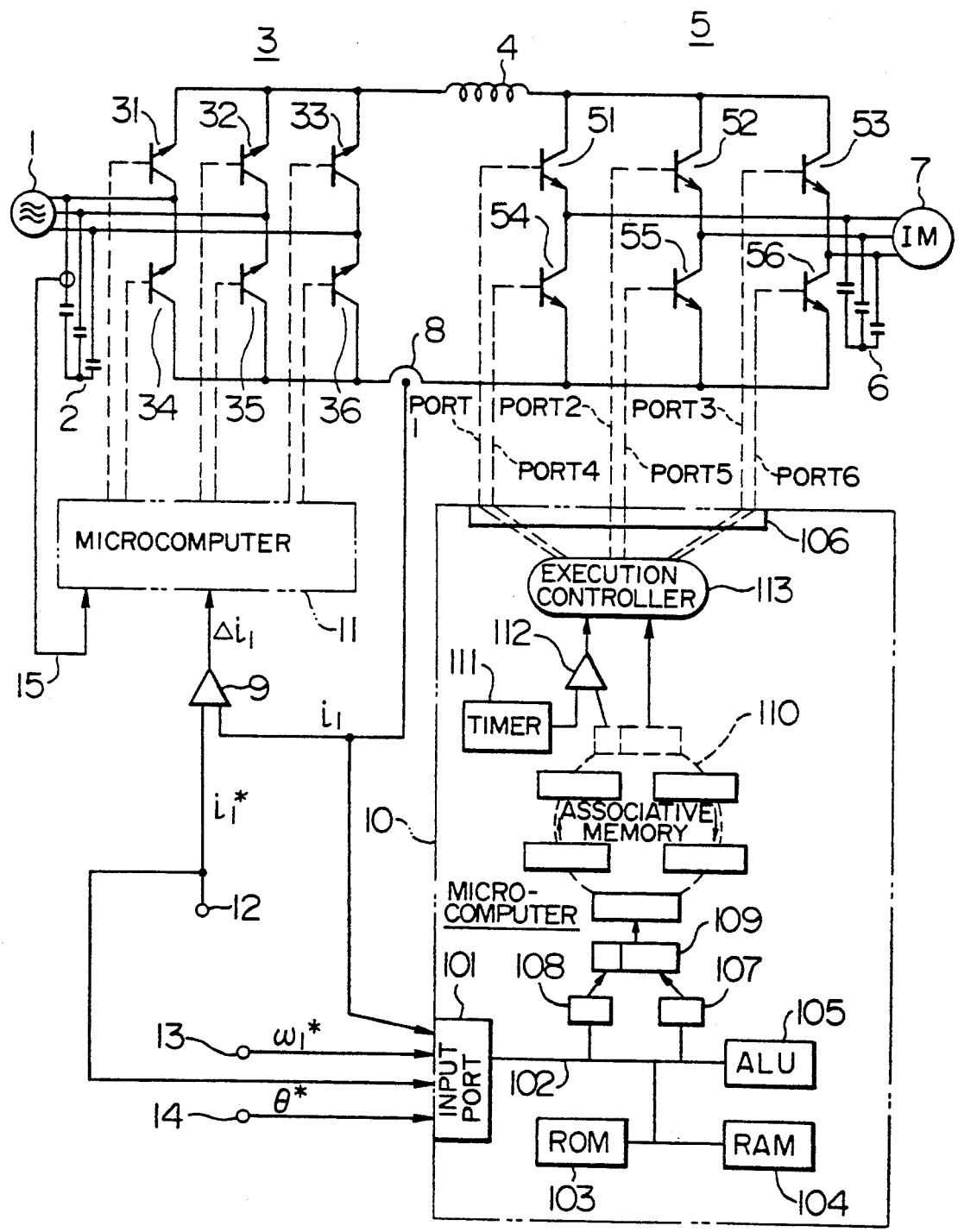
FIG. 9 is a block diagram showing a basic circuit configuration of a current-type inverter according to a third embodiment of the present invention.

FIG. 9 shows a third embodiment of the present invention, in which the microcomputer 10 for controlling the inverter 5 is supplied with a current instruction $i_1^*$ and a DC current $i_1$ detected at a DC current detector 8.

In the embodiment of FIG. 9, the component elements designated by the same reference numerals as those in FIG. 1 designate the same or equivalent component parts respectively.

Figure 10:
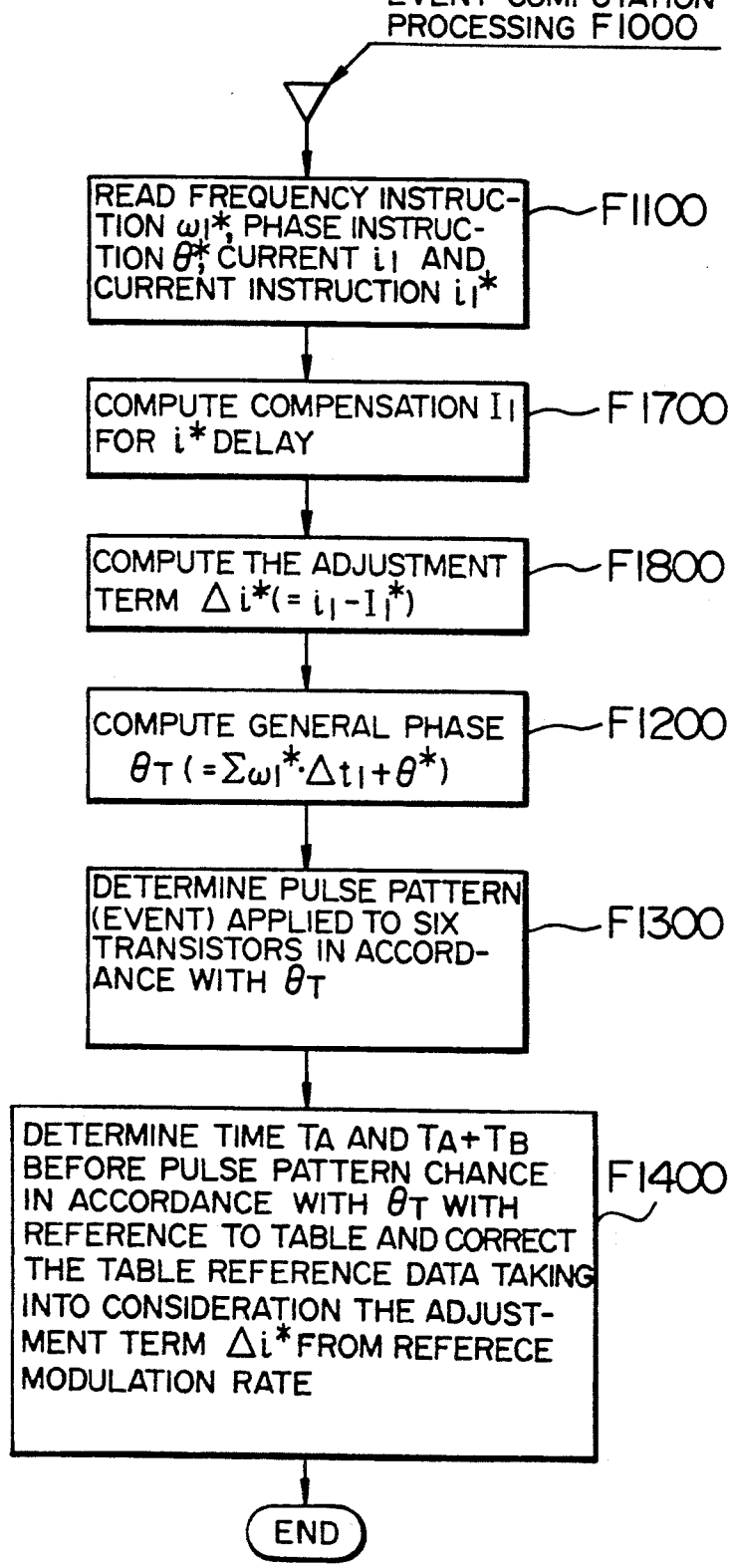
FIG. 10 is a flowchart showing the event computation processing in the embodiment shown in FIG. 9.

Step F1000 for event computation processing in the microcomputer 10 according to the third embodiment is effected according to the flow shown in FIG. 10.
(1) First, step F1100 takes in the frequency instruction $\omega_1^*$, phase instruction $\theta^*$ and also a DC current $i_1$ and a current instruction $i_1^*$.
(2) Then, step F1700 compensates the current instruction $i_1^*$ thus taken in at step F1100 for a delay corresponding to that of the current control system to compute a compensation value $I_1^*$. Further, step 1800 subtracts the compensation value $I_1^*$ from the DC current $i_1$ to determine a current error $\Delta i^*$, that is, an adjustment term of the modulation rate.
(3) As in the case of FIG. 2 mentioned above, step F1200 determines the general phase $\theta_T$, and step F1300 determines a pulse pattern (event) to be given to the six transistors in accordance with the general phase $\theta_T$.
(4) Finally, step 1400 determines from FIG. 4 the time data $T_A$ and $T_A+T_B$ taken before the pulse pattern is changed in accordance with the general phase $\theta_T$ calculated at step F1200, and further, taking the adjustment term $\Delta i^*$ determined at step F1800 into consideration, the above-mentioned time data, that is, the pulse width data is corrected and computed, thus preparing a pulse pattern used for event setting.

According to the third embodiment described above, as in the first and second embodiments, not only the DC reactor is reduced in size but also there is no need of an external comparator circuit or a delay element. The size of the control section is also reduced.

Figure 11:
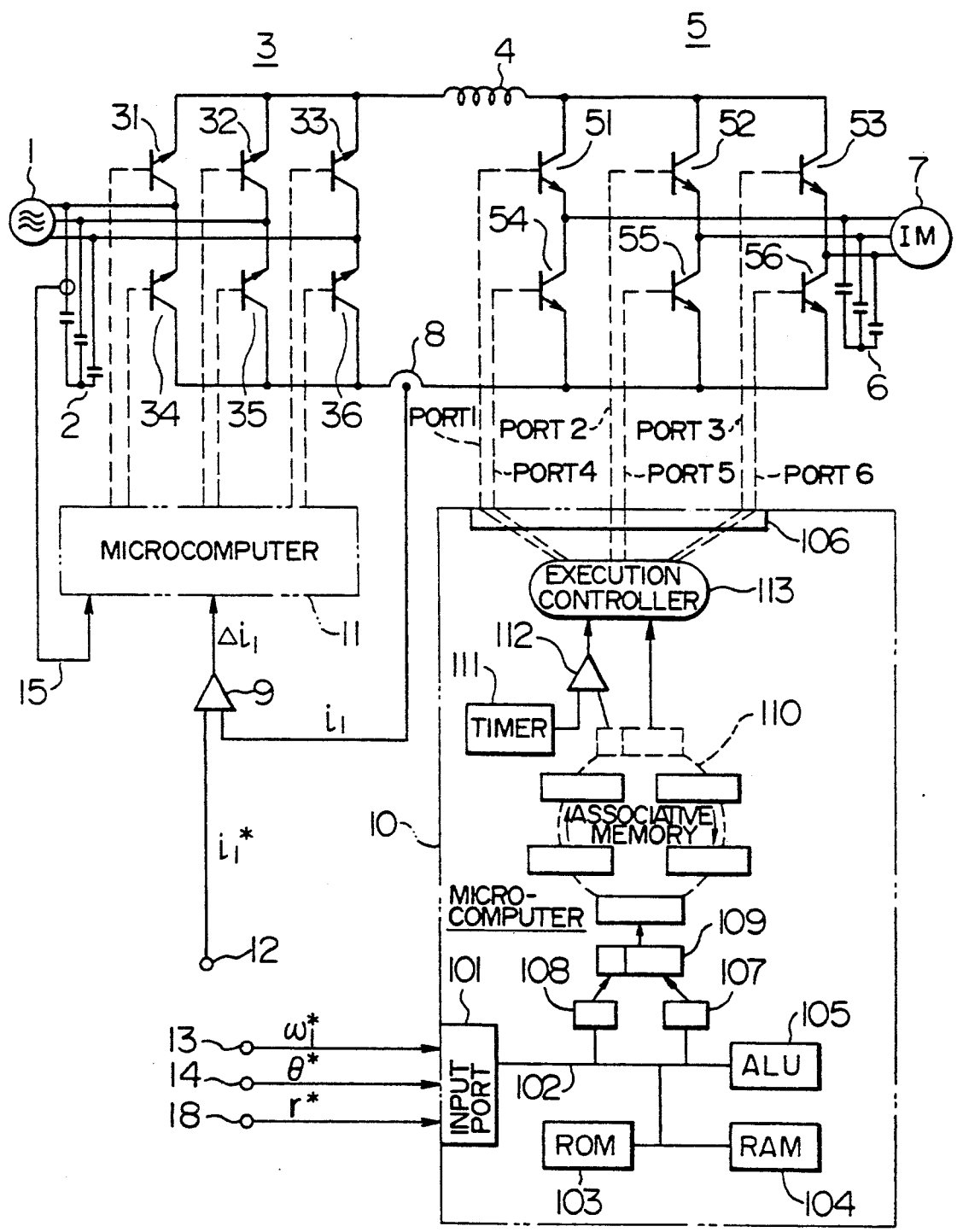
FIG. 11 is a block diagram showing a basic circuit configuration of a current-type inverter according to a fourth embodiment of the present invention.

A fourth embodiment of the present invention is shown in FIG. 11. According to this embodiment, which minimizes the high harmonic components contained in the inverter output, the control microcomputer 10 of the inverter unit 5 is supplied with a frequency instruction $\omega_1^*$, a phase instruction $\theta^*$ and also a modulation instruction $\gamma^*$ for the inverter output current from a terminal 18. The processing for event computation in the microcomputer 10 in this configuration is effected according to the flow shown in FIG. 12.

In FIG. 11, the component parts designated by the same reference numerals as in FIG. 1 designate the same or equivalent component parts respectively.

(1) First, steps F1100 to F1300 take in the frequency instruction $\omega_1{}^*$, the phase instruction $\theta^*$ and the modulation rate instruction $\gamma^*$, and as in other embodiments mentioned above, determine the general phase $\theta_T$, in accordance with which a pulse pattern (event) given to the six transistors is determined.

(2) Then, the time $T_A$ and $T_A+T_B$ taken before a pulse pattern change is determined with reference to a table as in the other embodiments. Further, in accordance with the modulation rate instruction $\gamma^*$ taken in at step F1100, the time data $T_A$ and $T_A+T_B$ are corrected to $\gamma^*.T_A$ and $\gamma^*.(T_A+T_B)$ thereby to prepare a pulse pattern for the transistors 51 to 55 of the inverter unit 5.

A fourth embodiment of the present invention has a primary feature in the manner of determining the modulation rate instruction value $\gamma^*$ given to the microcomputer 10.

Figure 13:
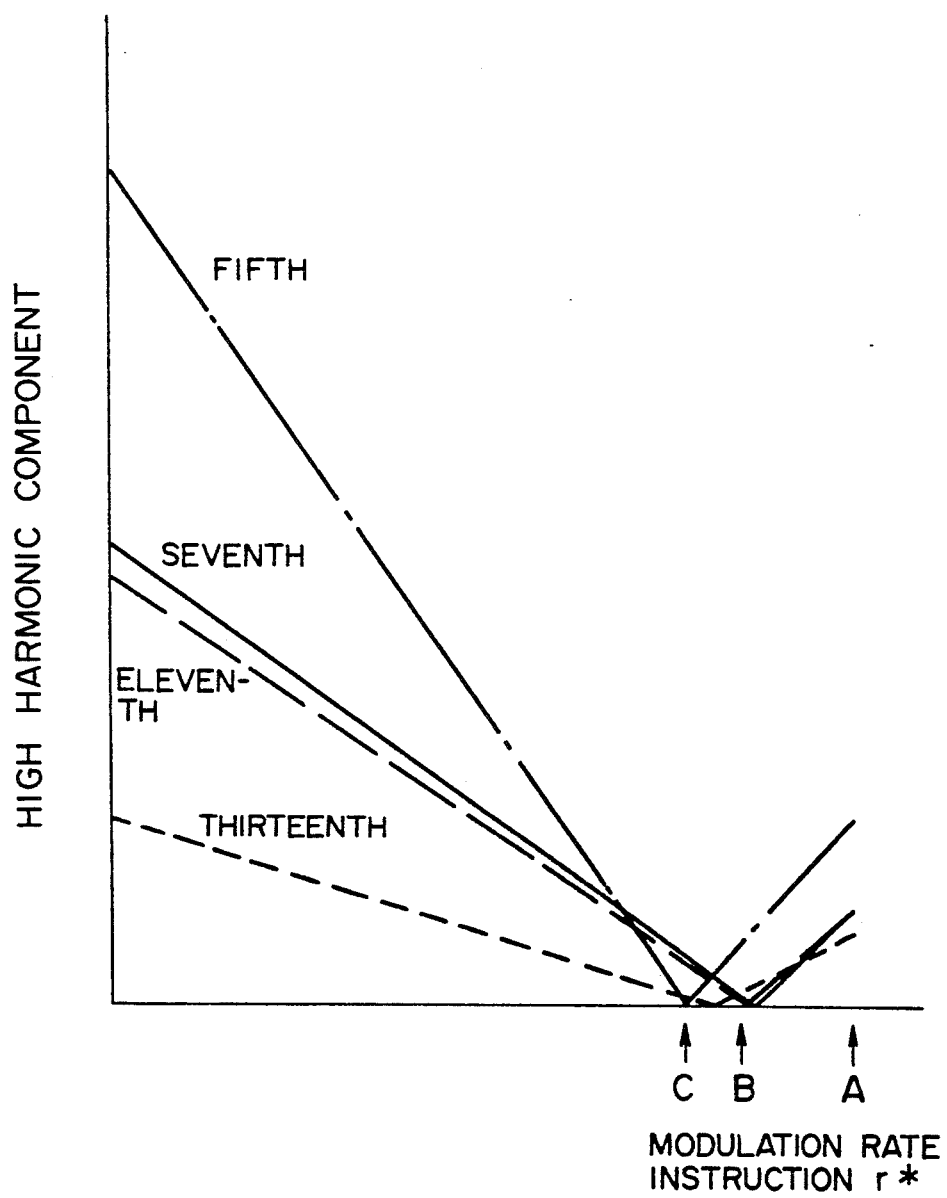
FIG. 13 is a diagram showing a modulation rate instruction used in the embodiment of FIG. 1.

An example of experiment conducted with various high harmonics is shown in FIG. 13, in which the abscissa represents the value of the modulation rate instruction $\gamma^*$ and the ordinate the magnitude of the high harmonic component contained in the output of the inverter unit 5 in the construction of the fourth embodiment of the present invention.

It is seen from this experiment result that if the main emphasis is placed on removing the fifth-power high harmonic component from the output of the inverter unit 5, the modulation rate instruction $\gamma^*$ applied to the microcomputer 10 providing an inverter control should be set at point C in FIG. 13. In a similar fashion, in the case where it is desired to remove only a specific high harmonic component other than above from the output of the inverter unit 5, a modulation rate instruction should be set that minimizes the magnitude of the high harmonic component corresponding to the characteristics thereof. Also, if it is desired to reduce the high harmonic components in a fashion with a view to the general value of the high harmonic components of the output of the inverter unit 5, on the other hand, the modulation rate instruction $\gamma^*$ should be set at a point in the neighborhood of point B in FIG. 13 where the high harmonic components are generally reduced. In setting the modulation rate instruction, a given modulation rate instruction $\gamma^*$ may be stored in the ROM 103 in the case of a fixed control for removing a specific high harmonic component. If the high harmonic to be removed changes depending on the situation, however, instructions may be applied by way of port from a terminal 18 as shown in FIG. 11. In such a case, the value $\gamma^*$ may be determined by a host microcomputer not shown as in the case of each instruction of $\omega_1{}^*$, $\theta^*$ and $i_1{}^*$.

Figure 12:
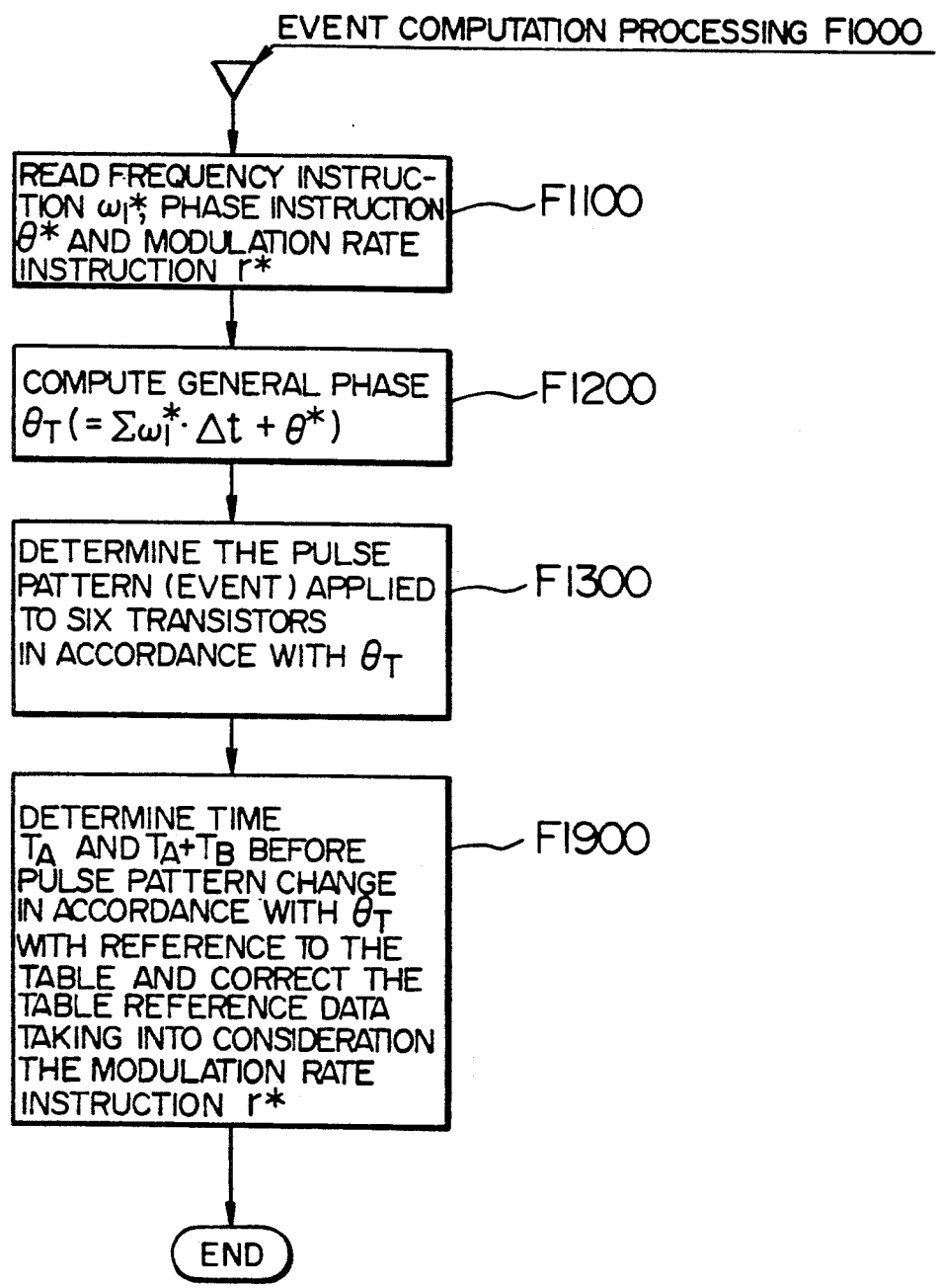
FIG. 12 is a flowchart of the event computation processing in the embodiment of FIG. 11.

As explained above, according to the fourth embodiment of the present invention, a modulation rate instruction at point B or C is set, and the modulation rate of the inverter unit 5 is controlled in accordance with the procedure shown in FIG. 12 to remove a specific high harmonic or reduce high harmonic components in general from the output of the inverter unit 5.

In the case of the fourth embodiment described above, however, the modulation rate is set at a level lower than a setting normally designated at point A, such as the above-mentioned reference rate or unity permitting the maximum output operation of the inverter, thereby causing a problem of a transiently small current value supplied to the motor, or the like making up the load 7. This problem may be solved to some degree by the operation of speed feedback control constituted by a major loop control circuitry not shown. Also, in order to improve this problem more positively, a cooperative control may be introduced in such a manner that the modulation rate instruction $\gamma^*$ is transmitted to the control microcomputer 11 of the converter unit 3 and the current decreasing on the inverter side is compensated incrementally by a converter.

Figure 14:
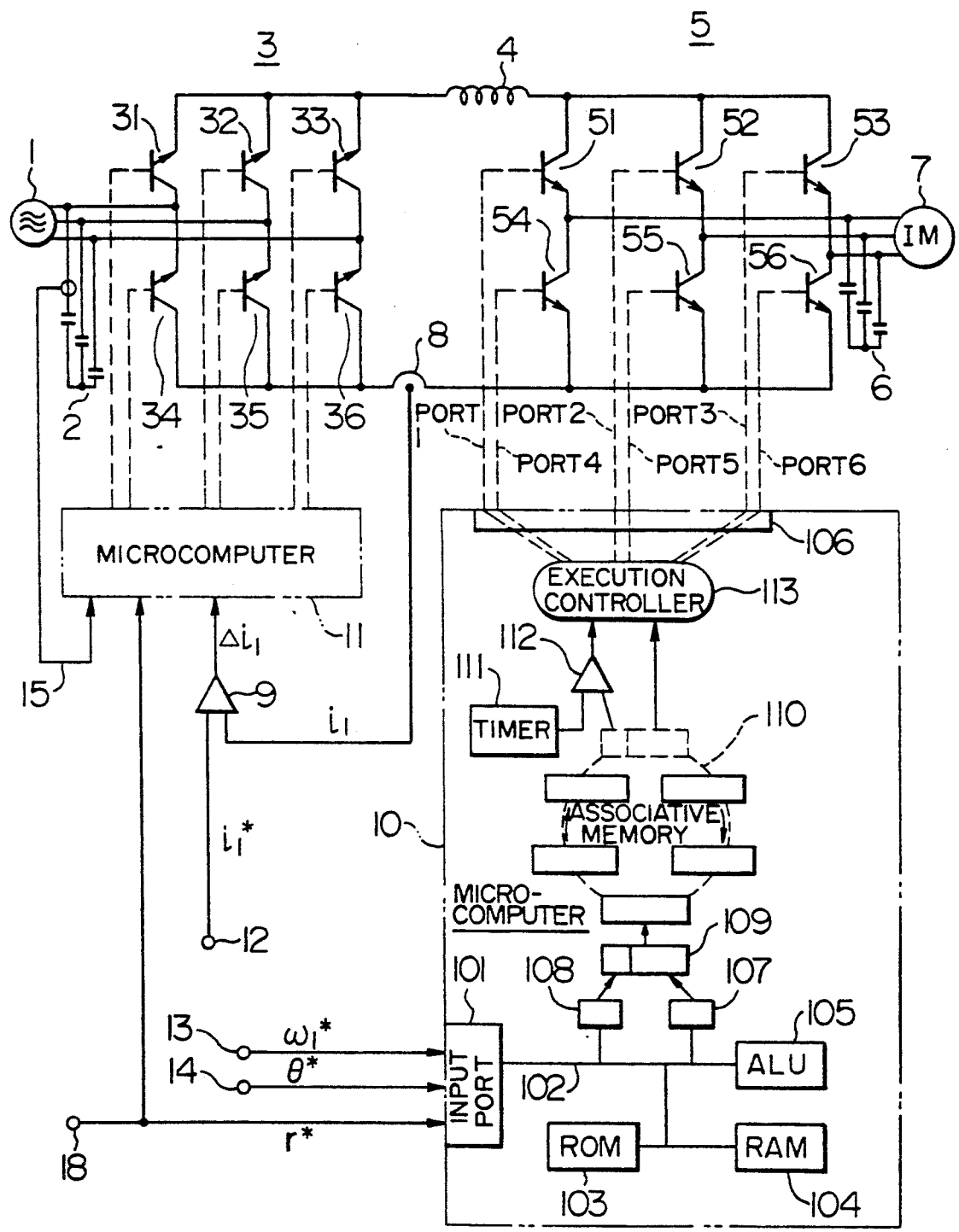
FIG. 14 is a block diagram showing a configuration of a modification of the fourth embodiment shown in FIG. 11.

FIG. 14 is a block diagram showing a configuration of a modification of the fourth embodiment of the present invention incorporating the last-mentioned functions.

In this example, the modulation rate instruction $\gamma^*$ is applied also to the control microcomputer 11 of the converter unit 3, and according to this modulation rate instruction $\gamma^*$, the microcomputer 11 controls the inverter unit 3 in such a way that the decreasing current on the inverter side is compensated upward on the converter side in advance.

In the fourth embodiment and a modification thereof explained above with reference to FIGS. 11 and 14, the modulation rate instruction $\gamma^*$ is applied to the inverter control microcomputer 10 from outside thereof. This modulation rate instruction $\gamma^*$, however, may be set in advance in the program of the ROM 103 of the microcomputer 10 with equal effect.

According to the fourth embodiment shown in FIGS. 11 and 14, like in the first embodiment of the present invention, the ripple component $\Delta i^*$ may be applied to the microcomputer 10 for compensating for the ripple component.

Figure 15:
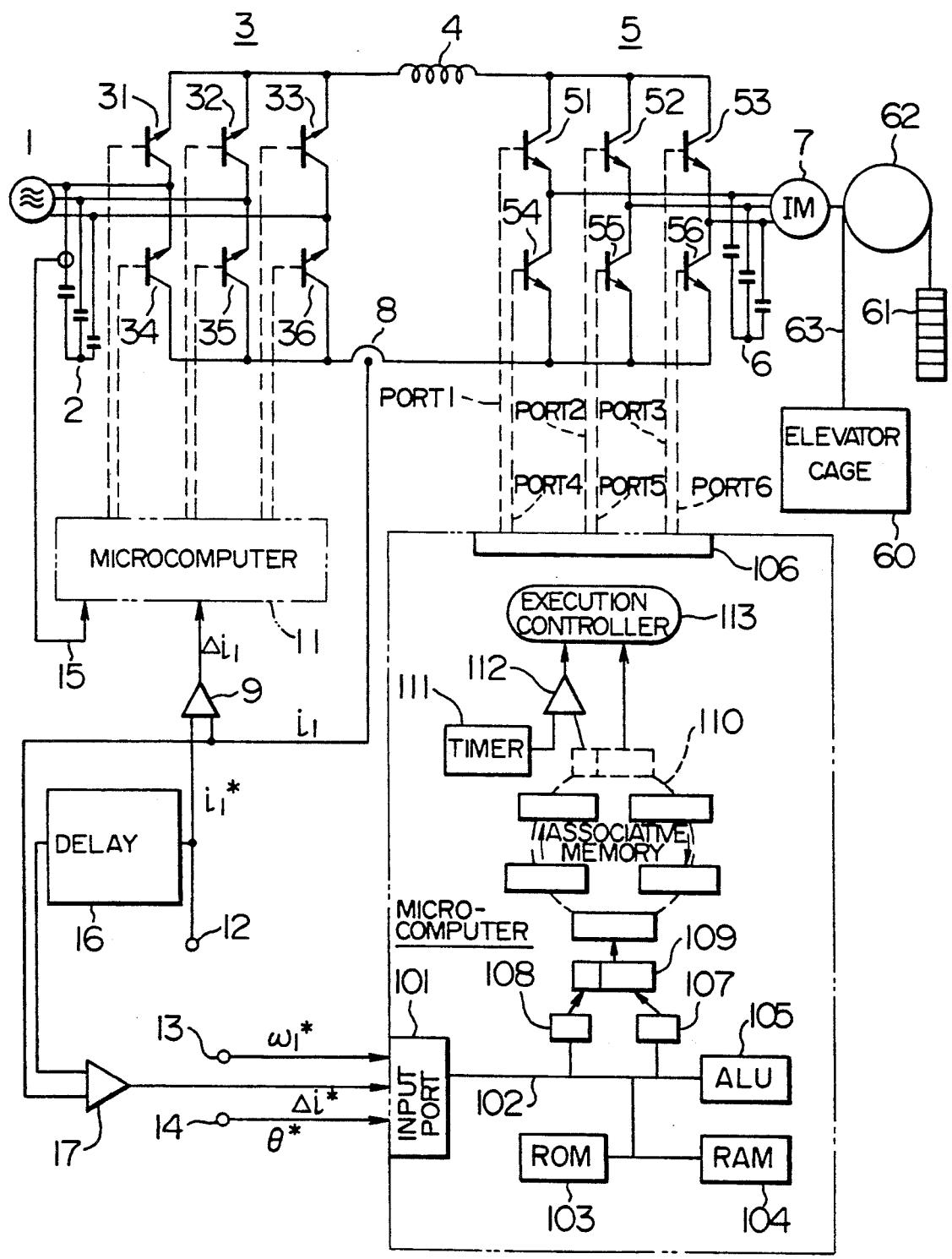
FIG. 15 is a block diagram showing a basic circuit configuration of a current-type inverter for driving an elevator according to a fifth embodiment of the present invention.

FIG. 15 is a block diagram showing a configuration of a fifth embodiment of the present invention to which the first embodiment shown in FIG. 1 is applied.

The fifth embodiment of the present invention is so constructed that in the first embodiment of the invention explained with reference to FIG. 1, the motor making up the load 7 drives an elevator cage 60 and a counterweight 61 through a rope 63 and a sheave 62. This system is thus configured with the inductance of the DC reactor set below 6 mH.

Generally, an elevator system comprises a control board incorporating a power converter including a converter unit 3, a DC reactor 4 and an inverter unit 5 and control microcomputers 10, 11, which control board is in turn installed in a machine room at the top floor of the building together with a winching motor or the like making up a load 7 of the power converter. The machine room is desirably small in space for effective utilization of indoor space.

Among the units installed in the control board, the DC reactor weighs several hundred kilograms for about 10 mH in the prior art. The weight and the bulkiness of the DC reactor occupying a large proportion of the machine room space has been a problem specific to an elevator system.

A fifth embodiment of the present invention shown in FIG. 15 is an application of the first embodiment shown in FIG. 1 to driving a winching motor for the elevator system, in which the inverter unit 3 is appropriately controlled to assure optimum control of the output thereof without being affected by the current ripple superimposed on the direct current applied to the same inverter unit 3. As a result, according to this embodiment, it has been confirmed that the inductance of the DC reactor is sufficiently reduced to less than 6 mH as compared with the prior art.

If the DC reactor 4 is reduced below 6 mH, the weight thereof is also saved by about one half as small as the conventional DC reactor of about 10 mH (as shown in FIG. 1). This reduction in size of the DC reactor (1) reduces the machine room space, (2) facilitates delivery into the machine room, (3) makes it possible to reduce the floor strength of the machine room, (4) saves the power loss at the DC reactor 4, and (5) lessens the size of the processing circuit to cope with an over voltage.

Figure 16:
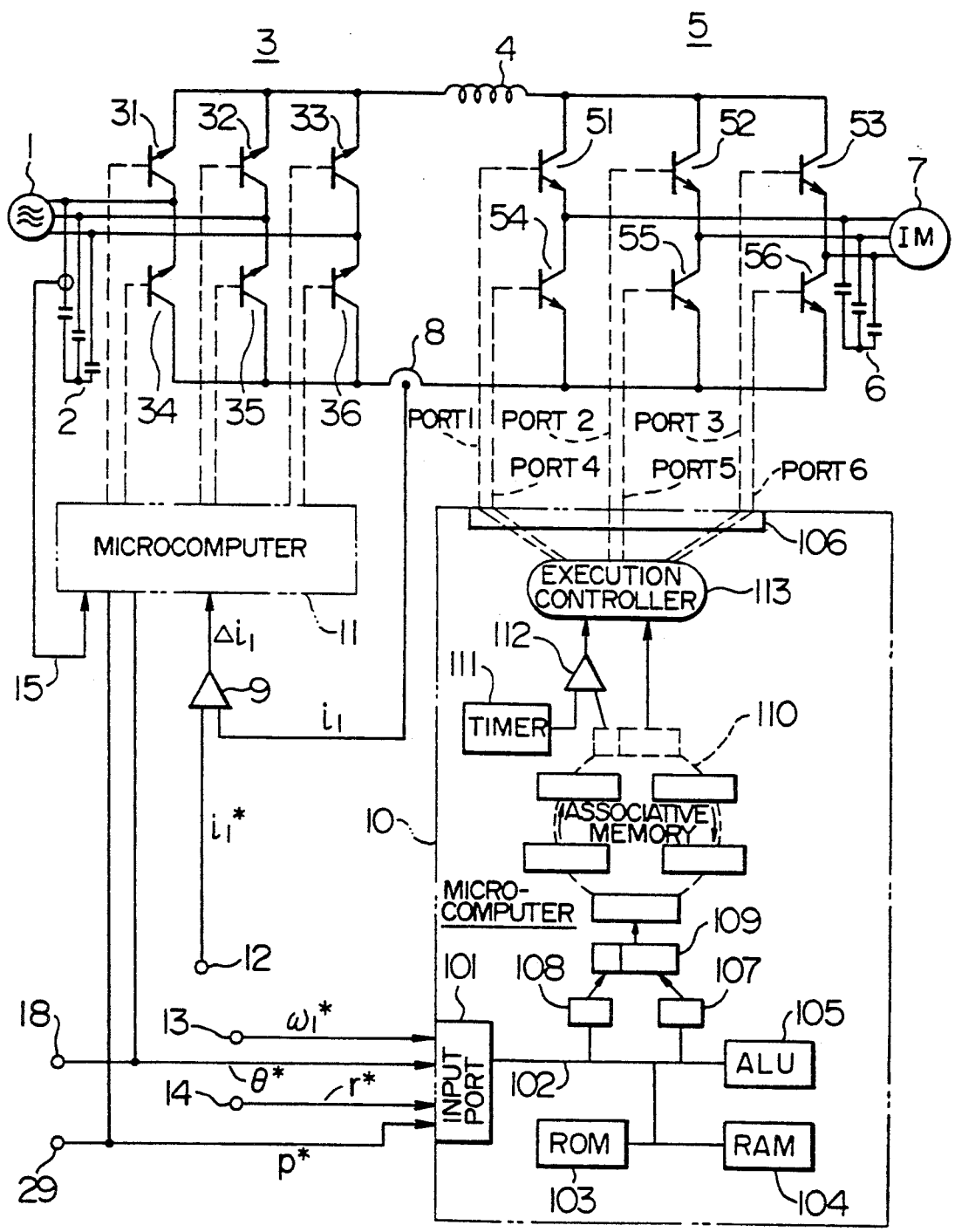
FIG. 16 is a block diagram showing a configuration of a current-type inverter according to a sixth embodiment of the present invention.

A sixth embodiment of the present invention shown in FIG. 16 is so configured that the control microcomputer 11 for the converter unit 3 and the control microcomputer 10 for the inverter unit 5 are supplied with a power demand instruction P* anew from a terminal 29 in addition to the modulation rate instruction $\gamma^*$ for the inverter unit 3. The power demand instruction P* is issued to designate "1" for full-load upward drive or no-load downward drive (under heavy load) and "0" for other cases (under light load) in an application of the present embodiment to elevator control or the like case requiring various inverter outputs. The modulation rate instruction $\gamma^*$ is for controlling the inverter modulation rate in a manner to minimize the high harmonic component of the inverter output as described above. Incidentally, the power demand instruction P*, like the instructions $\omega_1^*$ and $\theta^*$, are supplied automatically from the host (not shown) of the microcomputers 10, 11. Also, the ripple component tends to assume a large value in a low output region and a small value in a high output region. In a high output region involving a full-load upward operation, therefore, it is more important to supply power securely to the motor for assuring the upward movement of the elevator at a specified speed than to remove high harmonics.

Figure 17:
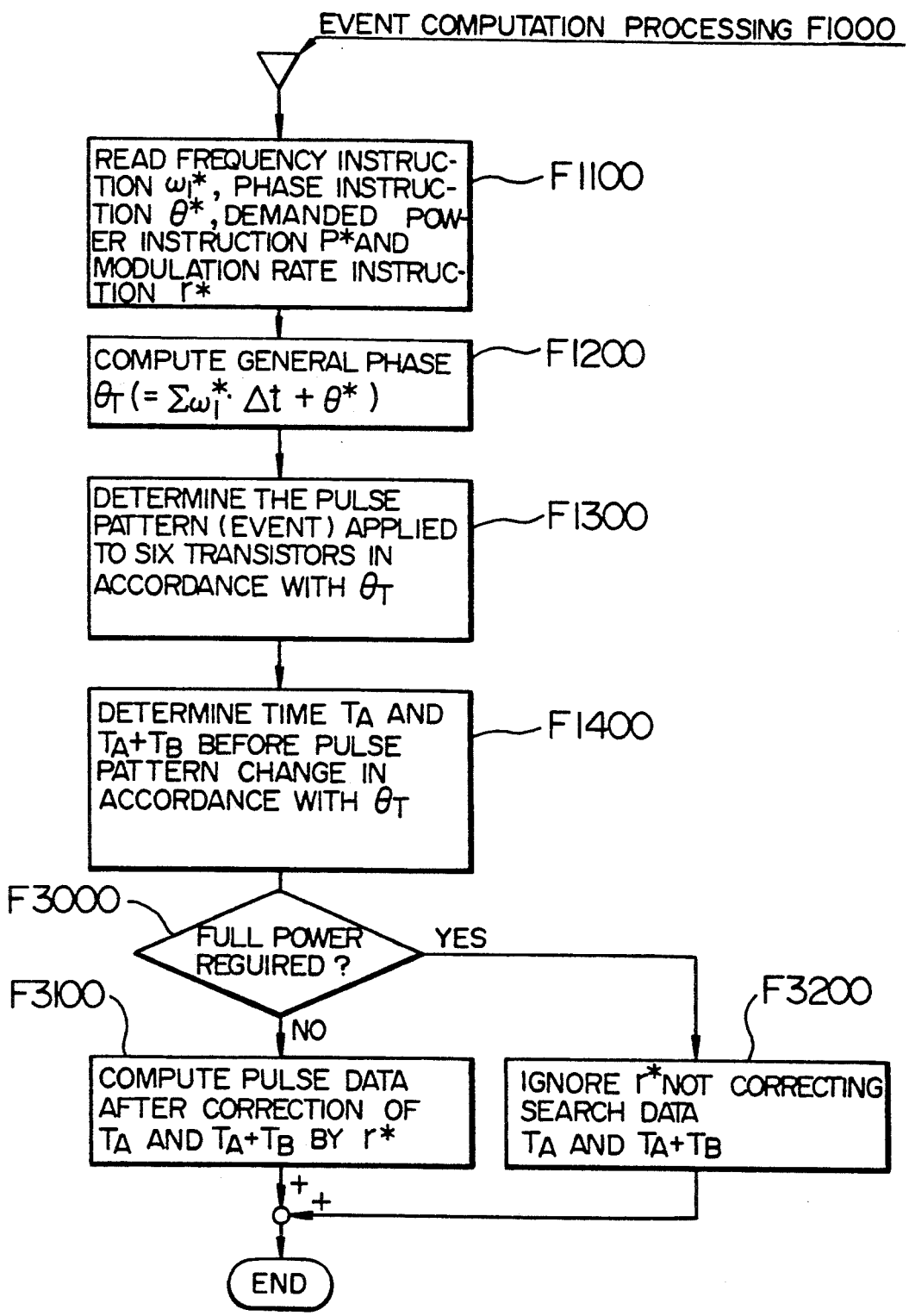
FIG. 17 is a flowchart of the event computation processing in the embodiment shown in FIG. 16.

The operation of step F1000 for even computation processing according to the sixth embodiment satisfying the above-mentioned requirements will be explained with reference to FIG. 17.

(1) First, steps F1100 to F1300 take in the frequency instruction $\omega_1^*$, phase instruction $\theta^*$, power demand instruction P* and the modulation rate instruction $\gamma^*$, determine the general phase $\theta_T$ in the same manner as in other embodiments described above, and thus determine a pulse pattern (event) to be applied to the six transistors in accordance with the value of the general phase $\theta_T$.

(2) Step F1400 then determines the time $T_A$ and $T_A+T_B$ taken before a change in pulse pattern with reference to a table as in other embodiments. The time data thus determined has such a value that the modulation rate of unity, that is, the output peak power of the inverter is retrieved most readily as an inverter control system.

(3) Step F3000 decides whether full power is to be produced at present, on the basis of the value of the power demand instruction P*.

(4) If the decision at step F3000 is "Yes", the process proceeds to step F3200 where the modulation rate instruction supplied is ignored, and while placing most emphasis on the power output, the time data $T_A$ and $T_A+T_B$ providing the pulse width data mentioned above are left uncorrected. Since the control microcomputer 10 for the inverter unit 5 is not controlled specifically against the modulation rate, the control microcomputer 11 for the converter 3 is not subjected to cooperative control in recognition of such fact from the power demand instruction P*.

(5) If the decision at step F3000 is "No", that is, when full power output is not required, on the other hand, in order to secure control placing emphasis on ripple-compensation, the process proceeds to step F3100 where the time data $T_A$ and $T_A+T_B$ are corrected in accordance with the modulation rate instruction $\gamma^*$ with reference to the table and the corrected data $\gamma^* \cdot T_A$ and $\gamma^* \cdot (T_A+T_B)$ are computed.

In the sixth embodiment described above, if the load demands full power, the modulation rate instruction may be ignored for preferring power control. When full power output is not required, by contrast, the modulation rate instruction is taken into consideration with primary emphasis placed on the index of performance for control, so that a reduced gain on the inverter side is recognized by the control microcomputer 11 of the converter unit 3 from the power demand instruction P* thereby to correct the modulation rate of the converter unit 3.

According to the sixth embodiment of the present invention, as explained above, a predetermined index of performance is usable for control even in the case where the capacity of the power converter is limited.

Although the sixth embodiment of the invention has been explained above with the power demand instruction P* in binary form, this instruction may be divided in multiple stages and the modulation rate instruction $\gamma^*$ may be presented in successive forms including "80% satisfactory control", "60% satisfactory control" and the like.

In each of the aforementioned embodiments, the transistors 31 to 36 and 51 to 56 of the converter unit 3 and the inverter unit 5 may be replaced by a gate turn-off thyristor GTO, field effect transistor FET, insulation gate bipolar transistor IGBT, thyristor with commutation circuit or the like with equal effect.

It will thus be understood from the foregoing description that according to the present invention a power converter may be controlled with a modulation rate based on a factor other than for normal modulation rate control, resulting in a smaller size of the DC reactor making up a DC-AC coupler, a smaller high harmonic component of the inverter output, and a reduced high harmonic component leaking out to the power supply side providing converter input. As additional effects, the reduced leak of the high harmonic component toward the power supply side prevents flicker of a fluorescent lamp which may be connected to the power supply on one hand and the overheating of a lagging capacitor on the other hand.

We claim:

1. A power converter comprising:
  a. a converter unit for converting an AC power applied thereto into a DC power which is produced as an output thereof;
  b. a current-type inverter unit for converting the DC power applied thereto from the converter unit into an AC power which is produced as an output thereof;
  c. a DC reactor inserted between the converter unit and the inverter unit; and
  d. a control unit for controlling switching operations of the converter unit and the inverter unit in a PWM control mode and including means for controlling a modulation rate in the conversion of the DC power into the AC power by the inverter unit in accordance with a predetermined instruction signal applied thereto.

2. A power converter according to claim 1, wherein the predetermined instruction includes a signal indicative of a DC ripple component of a DC current of the DC power generated by the converter unit and applied to the current-type inverter unit.

3. A power converter according to claim 2, wherein said ripple component is determined based on an actual measurement of the DC current applied to the current-type inverter unit.

4. A power converter according to claim 2, further comprising means for determining said ripple component as a function of an actual measurement of the DC current applied to the current-type inverter unit.

5. A power converter according to claim 1, wherein the predetermined instruction includes a frequency instruction signal, a phase instruction signal and a difference signal indicative of a difference between an actual measurement of a DC current applied to the inverter unit and a primary current instruction signal applied to the converter unit for the DC current.

6. A power converter according to claim 5, further comprising means for delaying the primary current instruction signal by a time period corresponding to a delay in operation of the converter unit in response to application of the primary current instruction signal thereto and means for determining the difference signal as a difference between the actual measurement of the DC current applied to the inverter unit and the delayed primary current instruction signal.

7. A power converter according to claim 2, further comprising means for determining the DC ripple component as a difference signal indicative of a difference between a primary current instruction signal applied to the converter unit and an actual measurement signal of the DC current applied to the inverter unit, which is obtained at a delay time period after application of the primary current instruction signal to the inverter unit, said delay time period corresponding to a delay in operation of the converter unit in response to the application of the primary current instruction signal.

8. A power converter according to claim 2, wherein the ripple component is determined based on predetermined data relating to the ripple component stored in a memory.

9. A power converter according to claim 8, wherein the predetermined data is indicative of a waveform of the ripple component and referred to in synchronism with the AC power.

10. A power converter according to claim 1, wherein the control unit controls the converter unit in accordance with the control of the modulation rate in the conversion of the DC power into the AC power in the inverter unit.

11. A power converter according to claim 1, wherein said predetermined instruction signal includes a signal indicative of the modulation rate at which high harmonic components of the output of the current-type inverter unit are minimized.

12. A power converter according to claim 1, wherein said predetermined instruction signal includes a signal indicative of the modulation rate at which a specific high harmonic component of the output of the current-type inverter unit is minimized.

13. A power converter according to claim 11, wherein said high harmonic components are minimized by an average at the modulation rate.

14. A power converter according to claim 1, wherein said predetermined instruction signal includes a first signal indicative of an operating condition of a load to which the output of the inverter unit is applied.

15. A power converter according to claim 14, wherein said predetermined instruction signal further includes a second signal indicative of a desired value of the modulation rate and the first signal indicates a power required by the load, and wherein the control unit puts more weight on the second signal than the first signal in the control of the inverter unit when the power required by the load is low.

16. A power converter according to claim 1, wherein said control unit includes means for controlling the switching operations of the inverter unit based on a difference between and DC current produced by the converter unit and a primary current instruction signal for the DC power so that the inverter unit produces an output of a sinusoidal waveform.

17. A power inverter according to claim 1, wherein the control unit includes means for controlling timings of gate pulses, which are applied to the inverter unit for turning on and off switching elements of the inverter unit, based on the modulation rate determined by a ripple component of a DC current of the DC power applied to the inverter unit and a predetermined reference modulation rate.

18. A power converter according to claim 17, wherein the modulation rate is determined by correcting the reference modulation rate by a difference between an actual value of the DC current applied to the inverter unit and a predetermined primary current instruction signal for the DC current so as to decrease the reference modulation rate by a value corresponding to the difference when the actual value of the DC current is larger than the primary current instruction signal and to increase the reference modulation rate by the value corresponding to the difference when the actual value of the DC current is smaller than the primary current instruction signal.

19. A power converter according to claim 1, wherein the control unit includes means for controlling an operation of switching elements of the inverter unit in the PWM control mode with the modulation rate determined by a ripple component of a DC current of the DC power applied to the inverter unit so that the inverter unit produces an output of a sinusoidal waveform.

20. A power converter comprising:
a. a converter unit for conveying an AC power applied thereto into a DC power which is produced as an output thereof;
b. a current-type inverter unit for converting the DC power applied thereto from the converter unit into an AC power which is produced as an output thereof;
c. A DC reactor inserted between the converter unit and the inverter unit;
d. a first control unit for controlling a current of the output of the converter unit by PWM control of switching elements of the converter unit;
e. a second control unit for controlling a frequency of the output of the inverter unit by PWM control of switching elements of the inverter unit and including means wherein said second control unit and including means for controlling a modulation rate in the conversion of the DC power into the AC power by the inverter unit in accordance with a predetermined instruction signal applied thereto.

21. A power converter according to claim 20, wherein said predetermined instruction signal includes a signal indicative of a DC triple component of the DC power applied to the inverter unit.

* * * * *